(12) United States Patent
Deshiikan et al.

(10) Patent No.: US 9,228,102 B2
(45) Date of Patent: Jan. 5, 2016

(54) SCRATCH RESISTANT INKS

(71) Applicant: XEROX CORPORATION, Norwalk, CT (US)

(72) Inventors: Srinivasa R. Deshiikan, Wilsonville, OR (US); Jeffrey J. Folkins, Rochester, NY (US); Paul J. McConville, Webster, NY (US); Joanne L. Lee, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/244,713

(22) Filed: Apr. 3, 2014

(65) Prior Publication Data

US 2015/0284575 A1 Oct. 8, 2015

(51) Int. Cl.
*C09D 11/02* (2014.01)
*C09D 11/34* (2014.01)

(52) U.S. Cl.
CPC .................................... *C09D 11/34* (2013.01)

(58) Field of Classification Search
CPC ........................................................ C09D 11/34
USPC .......................................... 106/31.29, 31.61
See application file for complete search history.

(56) References Cited

U.S. PATENT DOCUMENTS

| | | | |
|---|---|---|---|
| 4,490,731 A | 12/1984 | Vaught | |
| 5,000,786 A * | 3/1991 | Matsuzaki | 106/31.3 |
| 5,141,559 A * | 8/1992 | Shinozuka et al. | 106/31.31 |
| 5,195,430 A | 3/1993 | Rise | |
| 5,231,135 A | 7/1993 | Machell et al. | |
| 5,389,958 A | 2/1995 | Bui et al. | |
| 5,621,022 A | 4/1997 | Jaeger et al. | |
| 5,938,826 A * | 8/1999 | Baker et al. | 106/31.29 |
| 6,001,904 A * | 12/1999 | Matzinger et al. | 524/31 |
| 6,221,137 B1 | 4/2001 | King et al. | |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,766 B2 | 4/2004 | Mayolet et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,381,831 B1 | 6/2008 | Banning et al. | |
| 7,427,323 B1 | 9/2008 | Birau et al. | |
| 2010/0304040 A1 * | 12/2010 | Chretien et al. | 427/511 |
| 2012/0062669 A1 * | 3/2012 | Keoshkerian et al. | 347/102 |

* cited by examiner

*Primary Examiner* — Veronica F Faison

(74) *Attorney, Agent, or Firm* — Pillsbury Winthrop Shaw Pittman LLP

(57) ABSTRACT

An ink includes a $C_{10}$ to $C_{26}$ fatty acid and a microcrystalline wax, the ink exhibiting greater scratch resistance than a conventional ink as measured by scratch and fold testing.

17 Claims, 2 Drawing Sheets

SCRATCH RESISTANT INKS

BACKGROUND

Embodiments disclosed herein generally relate to inks. More specifically, embodiments disclosed herein relate to phase change inks that exhibit significantly improved scratch resistance compared to conventional inks. In particular, the inks disclosed herein exhibit significantly improved scratch resistance even at low temperatures.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In piezo ink jet printing processes employing hot melt inks, the phase change ink is melted by a heater in the printing apparatus and utilized (jetted) as a liquid in a manner similar to that of conventional piezo ink jet printing. Upon contact with the printing recording medium, the molten ink solidifies rapidly, enabling the ink to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks" or "solid inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

While numerous effective inks have been developed for phase-change digital printing in solid-ink-jet printing applications for their intended purpose, they may have limited utility in low temperature applications and/or may have high associated costs. A further continuing challenge in ink development is providing inks that exhibit significantly improved scratch resistance relative to current inks. This is especially the case when printing on paper or packaging employed at low temperatures, such as freezer bags, and the like, that may be handled many times.

SUMMARY

Figure 1:
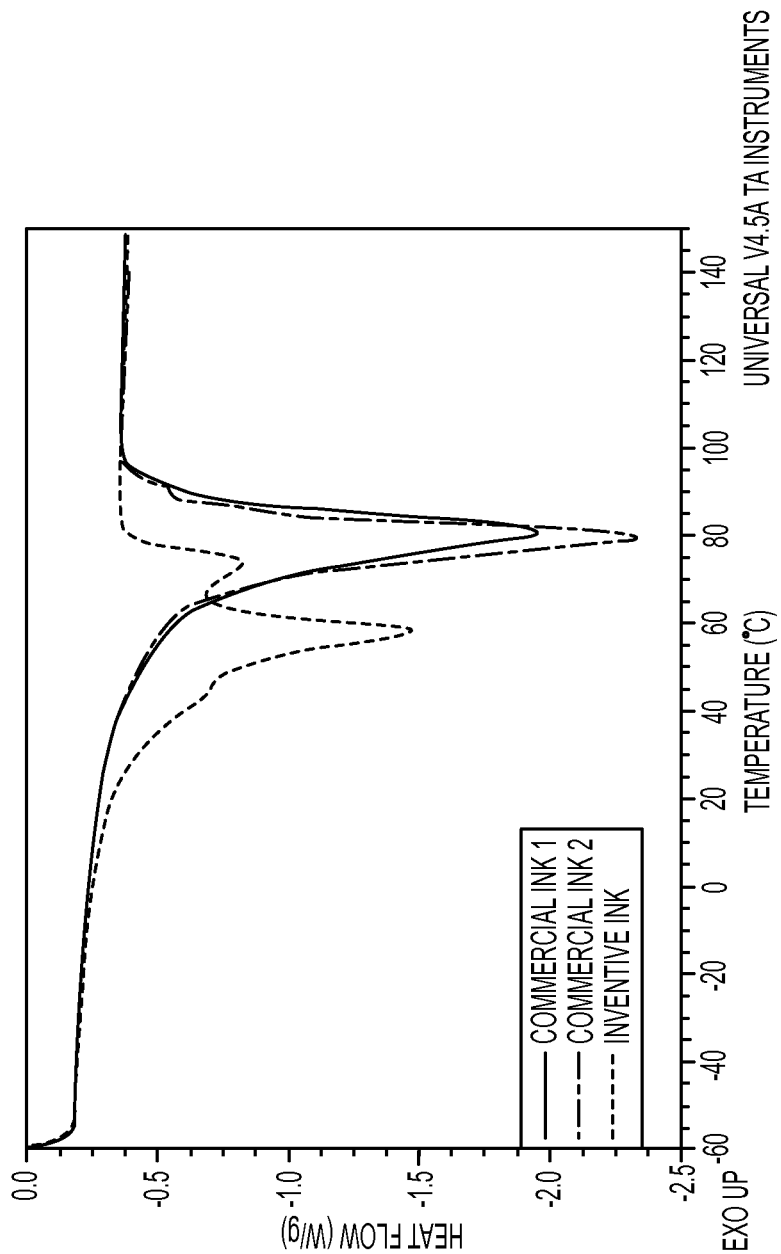
FIG. 1 shows a plot of differential scanning calorimetry (DSC) curves for two commerical inks overlaid with an ink prepared in accordance with embodiments disclosed herein.

In some aspects, embodiments disclosed herein relate to inks comprising a $C_{10}$ to $C_{26}$ fatty acid and a microcrystalline wax, wherein the inks exhibit scratch resistance greater than conventional phase change inks as measured by scratch and fold testing.

In some aspects, embodiments disclosed herein relate to inks comprising about 15% to about 25% by weight of the ink of stearic acid and about 30% to about 45% by weight of the ink of a microcrystalline wax.

In some aspects, embodiments disclosed herein relate to inks comprising stearic acid and a microcrystalline wax having a melting point in a range from about 55° C. to about 75° C.

DETAILED DESCRIPTION

Embodiments disclosed herein provide ink compositions that employ commercially available, low-cost components. The inks disclosed herien may be printed on versatile types of media, including paper, both coated and uncoated, and plastics. The inks may be used in solid-ink-jet phase-change printers after reducing the drum temperature to allow for low-temperature melting, for the particular applications described herein below.

Among unexpected performance characteristics, the inks disclosed herein exhibit significantly improved scratch resistance compared to standard inks. Medium and heavy scratch tests of the inks disclosed herein were significantly better than current commercial inks, while maintaining at least comparable fold performance. In some aspects, advantages of the ink compositions disclosed herein include that they comprise ingredients that are approved for direct contact with food. In some aspects, the inks disclosed herein are particularly suited for use in low temperature freezer applications, with the ink exhibiting substantially no brittling at low temperatures, such as between about 0 to −5° C. The aforementioned benefits of the inks disclosed herein and other benefits will be apparent to those skilled in the art.

In embodiments, there are provided inks comprising a $C_{10}$ to $C_{26}$ fatty acid, and a microcrystalline wax wherein the inks exhibit greater scratch resistance relative to conventional phase change inks as measured by scratch and fold testing. Numerous means exist for testing scratch resistance. For example, resistance can be determined using an ELCOMETER™ 3092 Sclerometer Hardness Tester or with a Rockwell indenter according to ISO 4586-2:2004 (E). In embodiments, scratch resistance of the inks disclosed herein are particularly significant under colder conditions where typical conventional phase change inks exhibit brittleness.

In embodiments, the $C_{10}$ to $C_{26}$ fatty acid may include any degree of saturation or unsaturation. Examples of saturated fatty acids include, without limitation, caprylic acid, capric acid, lauric acid, myristic acid, palmitic acid, stearic acid, arachidic acid, behenic acid, lignoceric acid, and cerotic acid. Examples of unsaturated fatty acids include, without limitation, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid. In embodiments, the fatty acid is a $C_{14}$ to $C_{22}$ fatty acid or a $C_{16}$ to $C_{20}$ fatty acid. In embodiments, the fatty acid is stearic acid.

In embodiments, when stearic acid is present as the fatty acid it may be present in a range from about 15% to about 25% by weight of the ink, including any value in between or fractions thereof, such as about 20%.

In embodiments, fatty acids may be used in combinations of two, three, four, or more and may include both synthetic and natural sources of fatty acids. In embodiments, the fatty acids may be obtained from renewable resources. In embodiments, the fatty acid or mixture of fatty acids may be selected based on ability to solubilize a colorant component. Additionally, the fatty acid may serve to impart conductivity to be functional in a printer by providing a charge. In embodiments, other amphiphilic molecules may serve nominally the same role as a fatty acid. Such compounds may be synthetic or natural. Such compounds may include a long carbon chain, such as $C_{10}$-$C_{26}$ and terminate in a charged group, such as sulfate, sulfonate, sulfinate, or phosphate.

In embodiments, the microcrystalline wax may be hydrocarbon based and may comprise mixtures of paraffin waxes. In embodiments, the microcrystalline wax and fatty acid are paired such that they are miscible. In embodiments, the microcrystalline wax is selected to be a malleable and exhibit a broad melting range. In embodiments, the microcrystalline wax has a melting point in a range from about 55° C. to about 75° C. In one exemplary embodiment, the microcrystalline wax has a melting point of about 70° C. Microcrystalline waxes useful in the inks disclosed herein may be characterized as having a hardness in a range from about 25 dmm to about 30 dmm, or about 28 dmm, and a viscosity in a range from about 12 $mm^2$/s to about 16 $mm^2$/s, or about 14 $mm^2$/s.

Microcrystalline waxes useful in methods disclosed herein include those employed in laminating applications. In embodiments, the microcrystalline wax may also be selected for compliance with regulatory food standards, such as those set forth by the Food and Drug Administration.

In embodiments, the microcrystalline wax may present in a range from about 30% to about 45%, or about 35% to about 40% by weight of the ink, including any value in between and fractions thereof.

In embodiments, the formulated inks may have an onset of melting about 10° C. to about 30° C. lower than a conventional phase change ink, as measured on a differential scanning calorimetry (DSC) curve. As used herein, "a conventional phase change ink" is an ink that exhibits an onset of melting at about 65° C. to about 70° C., typical of phase change inks known in the art. Thus, the inks disclosed herein advantageously provide printing with lower energy requirements while also remaining malleable under cold conditions. In embodiments, the melting point onset is in a range 15° C. to 20° C. lower than a conventional phase change ink, or about 20° C. lower. In embodiments, the ink has an onset of melting of about 40° C. to about 55° C. on the DSC curve, or about 46° C. as exemplified below in the Example.

In embodiments, inks disclosed herein are suitable for print on packaging in food freezer temperature applications. Such inks may be useful at any temperature between room temperature i.e., about 25° C. down to about to −5° C.

In embodiments, there are provided inks comprising about 15% to about 25% by weight of the ink of stearic acid and about 30% to about 45% by weight of the ink of a microcrystalline wax. In some such embodiments, the ink may have an onset of melting about 10° C. to about 30° C. lower than a conventional phase change ink, as measured on a differential scanning calorimetry (DSC) curve, i.e., an onset of melting of about 40° C. to about 55° C. on the DSC curve. In embodiments, this may be achieved with a microcrystalline wax has a melting point from about 55° C. to about 75° C., including any value inbetween or fraction thereof.

In embodiments there are provided inks comprising stearic acid and a microcrystalline wax having a melting point in a range from about 55° C. to about 75° C. Some such inks may comprise about 15 to about 25 weight percent stearic acid and about 30 to about 45 weight percent of the microcrystalline wax and exhibit an onset of melting of about 40° C. to about 55° C. on the DSC curve.

In embodiments, inks disclosed herein may be suitable for use at temperatures of about −5° C. without becoming brittle.

In any of the preceding embodiments, inks disclosed herein may further comprise a fatty amide. In embodiments, the amide compound may comprise a primary or secondary amide. Of the primary amides, various stearamides may be employed. The secondary amides, behenyl benenamide (KEMAMIDE® EX-666), and stearyl stearamide (KEMAMIDE S-180®), are useful amides. In particular embodiments, stearyl stearamide (KEMAMIDE® S-180) is the fatty-amide suitable for ink compositions disclosed herein. The fatty amide-containing compounds may comprise a plurality of fatty amide materials which are compatible with each other. Typically, even when a plurality of fatty amide-containing compounds are employed to produce the ink compositions, such compositions exhibit a substantially single melting point transition. In embodiments, ink compositions disclosed herein may exhibit more than one melting point transition, such as two melting point transitions.

The inks disclosed herein may further contain a tackifier such as the commercial derivatives of rosin acids derived from gum rosins or tall oil resins. Tackifiers encompass those which are compatible with fatty amide-containing materials. Representative examples include, but are not limited to, a glycerol ester of hydrogenated abietic (rosin) acid such as FORAL® 85, a glycerol ester of hydrogenated abietic (rosin) acid (commercially available from Eastman), FORAL® 105, a pentaerythritol ester of hydroabietic (rosin) acid (commercially available from Eastman), CELLOLYN® 21, a hydroabietic (rosin) alcohol ester of phthalic acid (commercially available from Eastman), ARAKAWA® KE-311 and KE-100 resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Sartomer), and the like. Tackifiers may be present in the ink in any effective amount, such as from about 0.01 percent by weight of the ink to from about 30 percent by weight of the ink, from about 0.1 percent by weight of the ink to about 25 percent by weight of the ink, from about 1 weight percent of the ink to about 20 weight percent of the ink.

Other additives may be present in the inks disclosed here. The ink compositions of the present embodiments may further optionally include one or more conventional additives to take advantage of the known functionality associated with such conventional additives. Such additives may include, for example, at least one isocyanate derived material, antioxidant, defoamer, slip and leveling agents, clarifier, viscosity modifier, adhesive, plasticizer and the like. When present, the optional additives may each, or in combination, be present in the ink in any desired or effective amount, such as from about 1% to about 10%, from about 5% to about 10%, or from about 3% to about 5% by weight of the ink.

In a typical ink composition antioxidants are added for preventing discoloration of the carrier composition. In embodiments, the antioxidant material can include IRGANOX® 1010; and NAUGARD® 76, NAUGARD® 445, NAUGARD® 512, and NAUGARD® 524. In embodiments, the antioxidant is NAUGARD® 445.

In embodiments, inks disclosed herein may further comprise a plasticizer. Exemplary plasticizers may include UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTI- CIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 to about 30 percent, from about 0.1 to about 25 percent, from about 1 to about 20 percent by weight of the ink.

While the inks disclosed herein are especially useful as black inks, any other colorants may be employed, including solvent and fluorescent dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

In embodiments, the phase change ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink. The colorant may be included in the ink in an amount of from, for example, about 0.1 to about 15% by weight of the ink, or from about 0.5 to about 6% by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

Example 1

This Example shows the preparation of an exemplary ink formulation, in accordance with embodiments disclosed herein.

A black ink was made using the formula shown in Table 1 below.

TABLE 1

Low Temp Black Ink Formula

| Chemical Name | | Wt. Frac. | Weight, g |
|---|---|---|---|
| Hysterene 9718 (C18 Fatty Acid) | PMC Group | 0.1945 | 38.89 |
| Microsere Wax 5714A | IGI | 0.3750 | 75.00 |
| Chemical - S180 | PMC Group | 0.2500 | 50.00 |

TABLE 1-continued

Low Temp Black Ink Formula

| Chemical Name | | Wt. Frac. | Weight, g |
|---|---|---|---|
| Chemical - KE-100 | Arakawa | 0.1255 | 25.11 |
| Chemical - Naugard 445 | Chempoint | 0.0020 | 0.40 |
| Dye - K VALIFAST 3850 | Orient | 0.0530 | 10.60 |
| Total | | 1.0000 | 200.00 |

Compounds in Table 1 were weighed into a 600 ml glass beaker. The beaker was covered with aluminum foil and put into a 120° C. oven for about four hours to allow the contents to completely melt. The beaker with the mixture in it was then taken out and set into a heating mantle also set to 120° C. The mixture was stirred with a propeller impeller for about one hour after which it was filtered. The filtrate was poured into ink stick molds and allowed to cool. The color strength and viscosity (at 110° C.) of the ink was measured and met specifications for printing.

HYSTRENE® 9718 is a food grade product having a high purity saturated fatty acid content with a 92% minimum stearic acid. Microsere 5714A is a highly ductile wax, used for glazing papers in contact with food. S180 is a vegetable derived fatty amide. KE100 is a plant derived rosin ester. NAUGAURD® 445 is employed as an antioxidant. Valifast 3850, a black dye from Orient Chemical is employed as a colorant.

MICROSERE 5714A is a microcrystalline wax useful in laminating applications and has a melting point of about 70° C., a hardness of about 28 dmm, and a viscosity at 100° C. of about 14 mm²/sec. Those skilled in the art will recognize that other commercial microcrystalline waxes are readily substituted and may have melting points in range from about 54 to 76° C., and a hardness ranging from about 20-35 dmm.

Example 2

This Example shows the characterization of the ink of Example 1, comparing its properties to typical commercial black inks.

The differential scanning calorimetry (DSC) curve of the ink of Example 1 was compared with current commercial black inks is shown in FIG. 1. From the DSC curve it can be seen that the onset of melting for the exemplary ink is about 46° C. compared to about 65° C. for current black inks, that is, about 20° C. lower. This indicates that the ink is designed to be printed at lower temperatures. Note, there are two peaks (transitions) in the heat curve for the exemplary ink compared to a single peak for the current inks. For the exemplary black ink, the second peak occurs around 74° C. The two peaks indicate two transitions in melting due to the use of both hard and malleable materials in the ink composition. The use of more malleable materials in the ink formulation of Example 1 makes it more stretchable.

In print testing, due to the lower onset of melting for the new ink, the drum temperature should be lowered by about 10° C. to allow proper transfixing of the ink to media. Once the printing conditions were set, the printer performed well printing images on several standard and coated media. The print process conditions for current black ink and the new ink are shown below in Table 2.

TABLE 2

| Print condition | Jet Temp. °C. | Drop mass ng | Media Temp. °C. | Spread Temp. °C. |
|---|---|---|---|---|
| Commercial ink | 120 | 26.8 | 55 | 55 |
| Example 1 ink | 117 | 24 | 45 | 40 |

Figure 2:
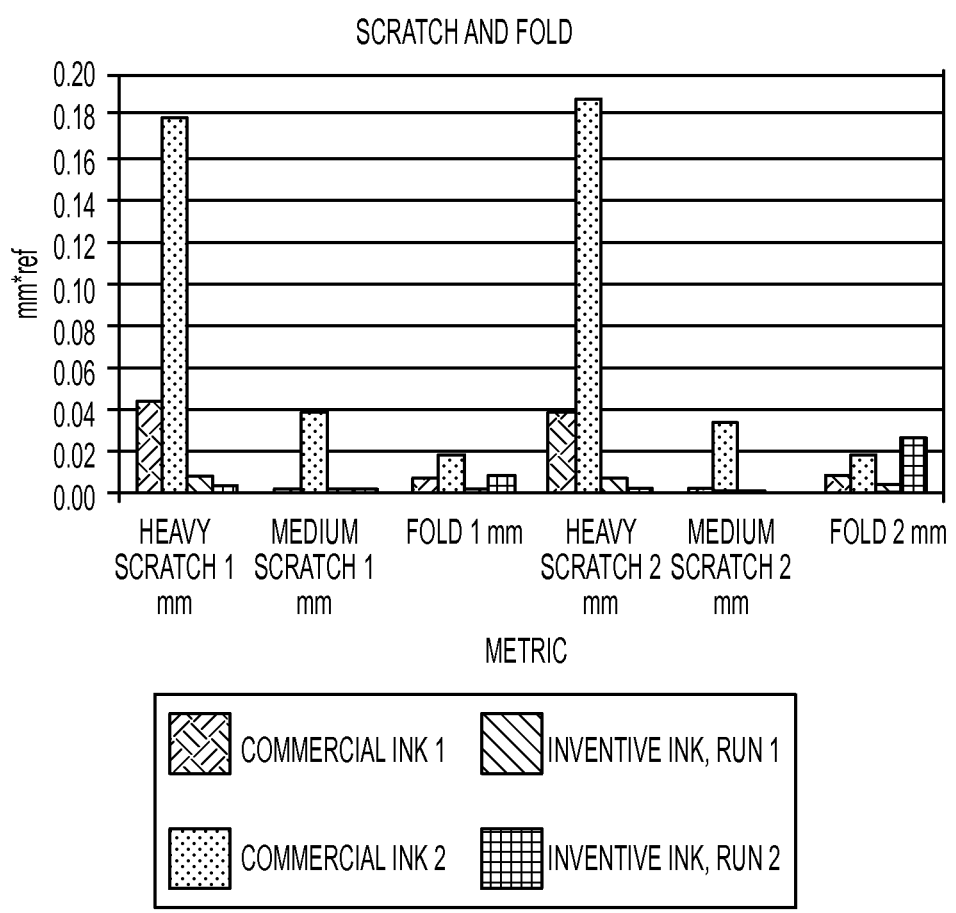
FIG. 2 shows a bar graph of scratch and fold testing comparing two commerical inks with duplicate runs of an ink prepared in accordance with embodiments disclosed herein.

The scratch and fold robustness of the ink was checked on Xerox 4200 paper and the results are shown in the bar graph of FIG. 2 and tabulated below in Table 3. A brief description of the scratch/fold test is as follows: a high area coverage print is placed flat and pushed beneath a rounded tip that is loaded with a predetermined weight. The scratch region is then measured with a software tool. For the fold test, a high area coverage sheet is used and a blank sheet is taped on top. The sheet is then fed through commercially available fold machine. It is unfolded gently and compared to standard image references (SIRs). Evaluation is done where ink cracks off at folds and transfers on to white sheet around the folds.

TABLE 3

| Robustness, # Layers | Heavy Scratch 1 mm | Medium Scratch 1 mm | Fold 1 mm | Heavy Scratch 2 mm | Medium Scratch 2 mm | Fold 2 mm | Fold Offset SIR | Mail Offset SIR | Mail Rub SIR |
|---|---|---|---|---|---|---|---|---|---|
| Prior art ink 1 | 0.04 | 0.00 | 0.01 | 0.04 | 0.00 | 0.01 | 3 | | |
| Prior art ink 2 | 0.18 | 0.04 | 0.02 | 0.18 | 0.03 | 0.02 | 4 | 5 | 5 |
| Example 1, run 1 | 0.01 | 0.00 | 0.00 | 0.01 | 0.00 | 0.00 | 3 | | |
| Example 1, run 2 | 0.00 | 0.00 | 0.01 | 0.00 | 0.00 | 0.03 | 3 | NA | NA |

The results indicate that the black ink of Example 1 is significantly more robust than the current black ink. In particular, the ink of Example 1 was superior in the scratch resistance test, where the lowest number indicates best performance. The fold appears comparable. Thus, as indicated in Table 3, inks disclosed herein may exhibit at least a two-fold, improvement over conventional inks, or at least 10-fold improvement, or at least 20-fold improvement, in both medium and heavy scratch tests.

A particular benefit of the ink of Example 1 relates to material costs for the inks. Table 4 below exemplifies the relative amounts of materials (and supplier availabilities) employed in the present embodiments for low temperature black ink formula compared to a conventional formula. The reduced ingredient list provides for more streamlined formulations with lower costs.

TABLE 4

| Chemical Name | Supplier | Wt. Frac. |
|---|---|---|
| Prior Art Black Ink Formula | | |
| Chemical - Xerox Resin #6 | Lacamas Labs | 0.1062 |
| Chemical - S180 | PMC Group | 0.1311 |

TABLE 4-continued

| Chemical Name | Supplier | Wt. Frac. |
|---|---|---|
| Chemical - KE - 100 | Arakawa | 0.0992 |
| Chemical - Xerox Clear #12 (Resin) | Lacamas Labs | 0.0121 |
| Chemical - Naugard 445 | Chempoint | 0.0017 |
| Chemical - ACUMELT 3910F | IGI & BP & Cytech | 0.5947 |
| Dye - K VALIFAST 3850 | Orient | 0.0533 |
| Chemical - DO 47 DYE | Lanxess | 0.0017 |
| Total | | 1.0000 |
| Low Temp Black Ink Formula | | |
| Hysterene 9718 (C18 Fatty Acid) | PMC Group | 0.1945 |
| Microsere Wax 5714A | IGI | 0.3750 |
| Chemical - S180 | PMC Group | 0.2500 |
| Chemical - KE - 100 | Arakawa | 0.1255 |
| Chemical - Naugard 445 | Chempoint | 0.0020 |
| Dye - K VALIFAST 3850 | Orient | 0.0530 |

The formulation of Example 1 incorporates two new components with lower material costs and lower melting temperatures while removing three components with higher material costs and higher melting temperatures. In doing so, the exemplary composition was adjustable to meet printing specifications. The result is a significant reduction in the material cost of the ink by more than 40% while improving its robustness.

What is claimed is:

1. An ink comprising:
   a $C_{18}$ fatty acid; and
   a microcrystalline wax having a hardness in a range from about 25 dmm to about 30 dmm and a viscosity in a range from about 12 mm$^2$/s to about 16 mm$^2$/, wherein the microcrystalline wax is presented in an amount of from about 30% to about 45% by weight of the ink,
   wherein the ink exhibits a greater scratch resistance than a conventional phase change ink that does not comprise the $C_{18}$ fatty acid and microcrystalline wax as measured by scratch and fold testing.

2. The ink of claim 1, wherein the fatty acid is stearic acid.

3. The ink of claim 1, wherein the ink has an onset of melting about 10° C. to about 30° C. lower than a conventional phase change ink, as measured on a differential scanning calorimetry (DSC) curve.

4. The ink of claim 2, wherein the ink has an onset of melting of about 40° C. to about 55° C. on the DSC curve.

5. The ink of claim 1, wherein the microcrystalline wax has a melting point in a range from about 55° C. to about 75° C.

6. The ink of claim 4, wherein the microcrystalline wax has a melting point of about 70° C.

7. The ink of claim 1, wherein the ink is suitable for print on packaging in food freezer temperature applications.

8. The ink of claim 1, wherein stearic acid is present at about 15% to about 25% by weight of the ink.

9. An ink comprising:
   about 15% to about 25% by weight of the ink of stearic acid;
   about 30% to about 45% by weight of the ink of a microcrystalline wax having a hardness in a range from about 25 dmm to about 30 dmm and a viscosity in a range from about 12 mm$^2$/s to about 16 mm$^2$/s; and
   an amphiphilic molecule comprising a $C_{10}$-$C_{26}$ chain and terminating in a charged group selected from the group consisting of sulfate, sulfonate, sulfinate, and phosphate, wherein the ink has an onset of melting of about 40° C. to about 55° C. on the DSC curve.

10. The ink of claim 9, wherein the ink has an onset of melting about 10° C. to about 30° C. lower than a conventional phase change ink, as measured on a differential scanning calorimetry (DSC) curve.

11. The ink of claim 9, wherein the microcrystalline wax has a melting point from about 55° C. to about 75° C.

12. The ink of claim 9, wherein the microcrystalline wax has a melting point of about 70° C.

13. An ink comprising:
   stearic acid;
   a microcrystalline wax having a melting point in a range from about 55° C. to about 75° C., a hardness in a range from about 25 dmm to about 30 dmm and a viscosity in a range from about 12 mm$^2$/s to about 16 mm$^2$/s; and
   an amphiphilic molecule comprising a $C_{10}$-$C_{26}$ chain and terminating in a charged group selected from the group consisting of sulfate, sulfonate, sulfinate, and phosphate, wherein the ink has an onset of melting of about 40° C. to about 55° C. on the DSC curve.

14. The ink of claim 13, comprising about 15 to about 25 weight percent stearic acid and about 30 to about 45 weight percent of the microcrystalline wax.

15. The ink of claim 13, wherein the ink is suitable for use at temperatures of about −5° C. without becoming brittle.

16. The ink of claim 13, further comprising a fatty amide.

17. The ink of claim 13, further comprising a colorant.

* * * * *